(12) United States Patent
Chang et al.

(10) Patent No.: US 10,480,787 B2
(45) Date of Patent: Nov. 19, 2019

(54) COMBUSTOR WALL COOLING CHANNEL FORMED BY ADDITIVE MANUFACTURING

(71) Applicant: United Technologies Corporation, Hartford, CT (US)

(72) Inventors: Hoyt Y. Chang, Manchester, CT (US); Christos Adamopoulos, Cromwell, CT (US); Stanislav Kostka, Jr., Shrewsbury, MA (US)

(73) Assignee: United Technologies Corporation, Farmington, CT (US)

( * ) Notice: Subject to any disclaimer, the term of this patent is extended or adjusted under 35 U.S.C. 154(b) by 555 days.

(21) Appl. No.: 14/669,206

(22) Filed: Mar. 26, 2015

(65) Prior Publication Data
US 2016/0281986 A1    Sep. 29, 2016

(51) Int. Cl.
| | |
|---|---|
| *F23R 3/00* | (2006.01) |
| *B22F 3/105* | (2006.01) |
| *B22F 5/00* | (2006.01) |
| *F23R 3/06* | (2006.01) |
| *F23R 3/50* | (2006.01) |
| *B33Y 10/00* | (2015.01) |

(Continued)

(52) U.S. Cl.
CPC ............ *F23R 3/002* (2013.01); *B22F 3/1055* (2013.01); *B22F 5/009* (2013.01); *F23R 3/007* (2013.01); *F23R 3/06* (2013.01); *F23R 3/50* (2013.01); *B22F 2003/1057* (2013.01); *B33Y 10/00* (2014.12); *B33Y 50/02* (2014.12); *B33Y 80/00* (2014.12); *F23R 2900/00018* (2013.01); *F23R 2900/03042* (2013.01); *F23R 2900/03043* (2013.01); *Y02T 50/675* (2013.01)

(58) Field of Classification Search
CPC .... F23R 3/002; F23R 3/06; F23R 3/50; F23R 2900/03042; F23R 2900/03044; F23R 2900/03041
See application file for complete search history.

(56) References Cited

U.S. PATENT DOCUMENTS

| | | | |
|---|---|---|---|
| 4,064,300 A | 12/1977 | Bhangu | |
| 4,104,874 A * | 8/1978 | Caruel | F23R 3/002 431/351 |
| 4,361,010 A | 11/1982 | Tanrikut et al. | |

(Continued)

FOREIGN PATENT DOCUMENTS

EP    1939529 A1    7/2008

OTHER PUBLICATIONS

Extended European Search Report for EP Application No. 16161872.3, dated Jul. 29, 2016, 9 pages.

*Primary Examiner* — Craig Kim
(74) *Attorney, Agent, or Firm* — Kinney & Lange, P.A.

(57) ABSTRACT

A cooled wall for lining a combustor of a gas turbine engine includes an annular outer wall defining a radial passage extending therethrough, an inner wall spaced radially from the outer wall to define an axial channel in fluid communication with the radial passage, and a connecting wall joining the inner wall to the outer wall. A method of making the cooled wall includes providing a three-dimensional computer model of the cooled wall, depositing a uniform thickness layer of material on a substrate, using a laser or electron beam to melt or sinter the material to form a cross section, repeating the depositing and cross section steps to form the cooled wall, and heat treating the cooled wall.

13 Claims, 8 Drawing Sheets

(51) Int. Cl.
  *B33Y 50/02*          (2015.01)
  *B33Y 80/00*          (2015.01)

(56)          References Cited

U.S. PATENT DOCUMENTS

| | | | |
|---|---|---|---|
| 4,864,828 | A | 9/1989 | Matheny et al. |
| 5,461,866 | A | 10/1995 | Sullivan et al. |
| 6,720,088 | B2* | 4/2004 | Zhao .................. B32B 15/01 |
| | | | 148/408 |
| 6,761,031 | B2 | 7/2004 | Bunker |
| 8,408,010 | B2 | 4/2013 | Garry et al. |
| 8,647,053 | B2* | 2/2014 | Hsu .................... F01D 9/023 |
| | | | 415/115 |
| 8,800,298 | B2* | 8/2014 | Ladd .................... F23R 3/002 |
| | | | 60/792 |
| 8,813,502 | B2 | 8/2014 | Ishiguro et al. |
| 2003/0145604 | A1 | 8/2003 | Pidcock et al. |
| 2009/0142548 | A1 | 6/2009 | Patterson et al. |
| 2012/0036858 | A1 | 2/2012 | Lacy et al. |
| 2013/0015609 | A1 | 1/2013 | Landau |
| 2013/0170963 | A1* | 7/2013 | Mironets ............... F01D 11/12 |
| | | | 415/173.1 |
| 2013/0318975 | A1 | 12/2013 | Stoia et al. |
| 2014/0202163 | A1 | 7/2014 | Johnson et al. |
| 2014/0216042 | A1 | 8/2014 | Hanson |
| 2014/0250894 | A1 | 9/2014 | Petty, Sr. et al. |
| 2016/0222793 | A1* | 8/2016 | Snyder .................. F01D 5/189 |

\* cited by examiner

COMBUSTOR WALL COOLING CHANNEL FORMED BY ADDITIVE MANUFACTURING

BACKGROUND

The present invention relates to wall panels for use in gas turbine engine combustors, and in particular to wall panels with cooling paths for creating a cooling film and methods of manufacturing cooled walls of combustors. Combustors used in commercial gas turbine engines, such as those used in aircraft or power generation, may generate combustion gases at very high temperatures. These temperatures are often high enough to damage the combustor wall unless sufficient cooling is provided. Combustor walls also carry mechanical loads that include loads due to pressure and/or interference fits from assembled components. Despite cooling schemes, combined thermal cycling and mechanical loads cause combustor panels to crack due to thermal mechanical fatigue ("TMF"). Cracked combustor panels must be replaced to avoid liberating portions of the panel and damaging downstream gas turbine components. Therefore, a need exists to provide a cooled wall for a combustor that has increased durability.

SUMMARY

A cooled wall for lining a combustor of a gas turbine engine includes an annular outer wall defining a radial passage extending therethrough, an inner wall spaced radially from the outer wall to define an axial channel in fluid communication with the radial passage, and a connecting wall joining the inner wall to the outer wall.

A combustor section of a gas turbine engine includes a plurality of annular wall segments that define a cavity for combustion and that define a plurality of radial passages extending therethrough, a plurality of inner wall segments spaced radially from the annular wall segments so as to define axial channels in fluid communication with the radial passages, and a plurality of connecting walls extending in a generally radial direction from the plurality of annular wall segments to the plurality of inner wall segments. The inner wall segments are configured to define openings between adjacent inner wall segments.

A method of making the cooled wall includes providing a three-dimensional computer model of the cooled wall, depositing a uniform thickness layer of material on a substrate, using a laser or electron beam to melt or sinter the material to form a cross section, forming additional cross sections to create the cooled wall, and heat treating the cooled wall.

DETAILED DESCRIPTION

Figure 1A:
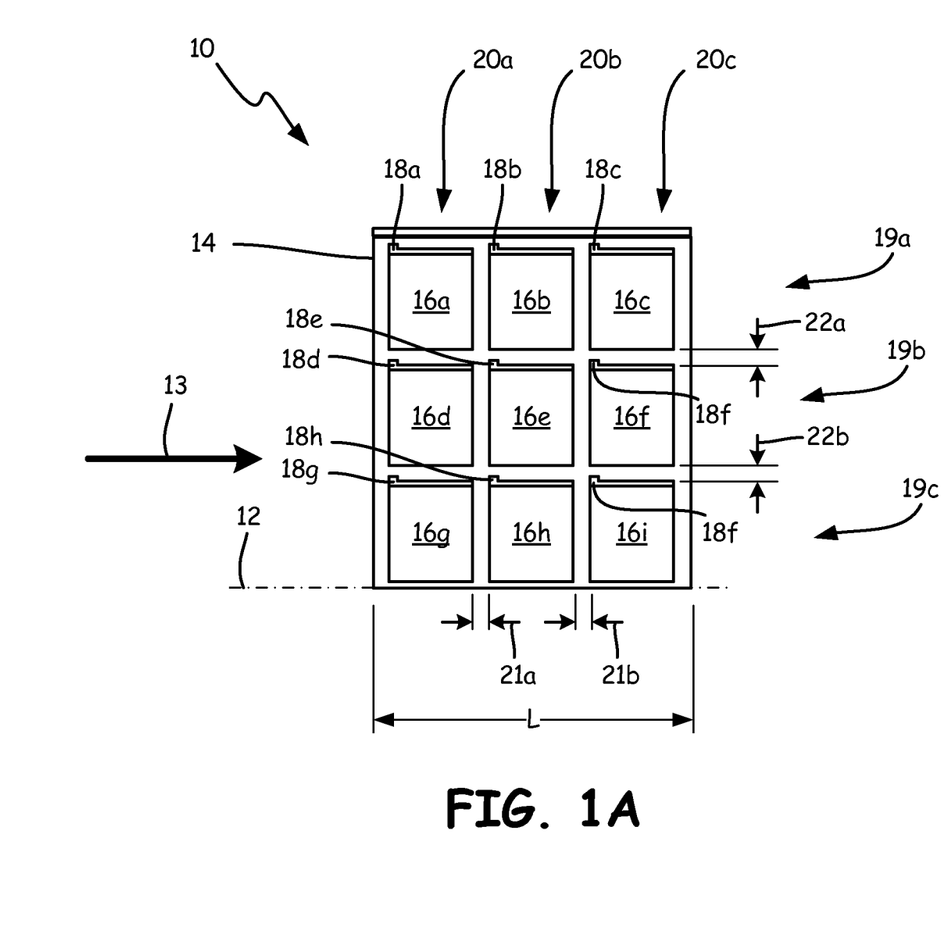
FIG. 1A is a front view of a combustor wall.
Figure 1B:
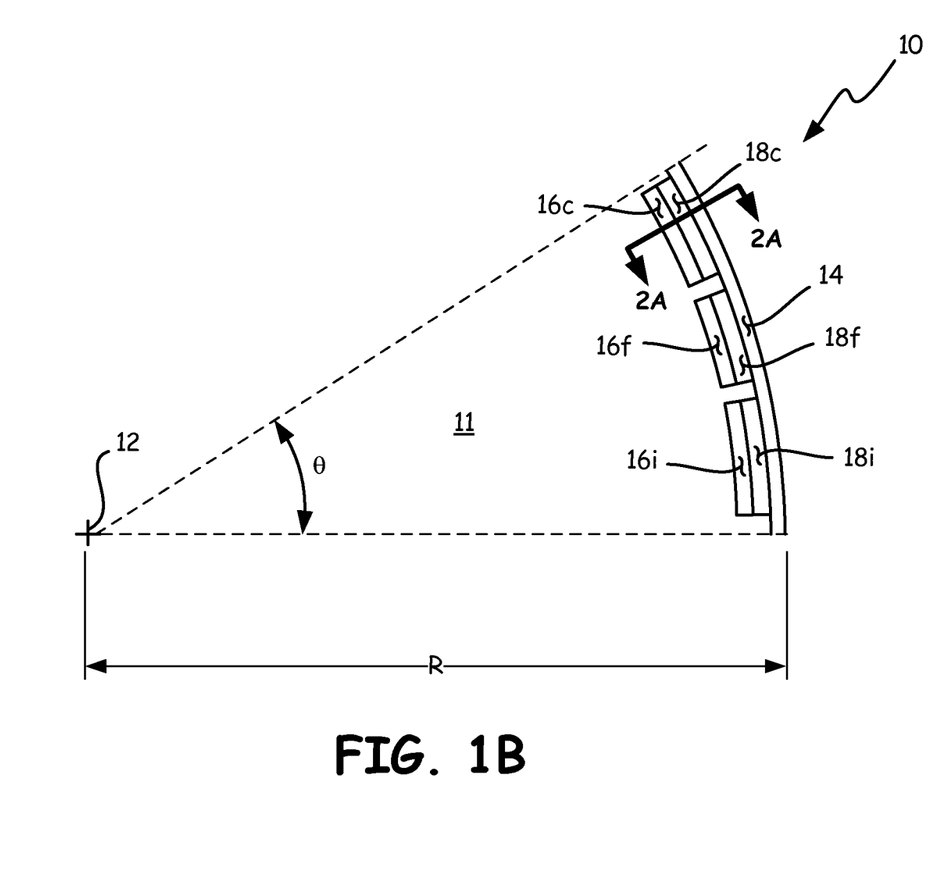
FIG. 1B is an end view of the combustor wall in FIG. 1A.

FIGS. 1A and 1B show front and end views of wall 10, sometimes referred to as a cooled wall panel, in accordance with the present invention. Although not shown in FIGS. 1A and 1B, wall 10 can be one of multiple walls that bound region 11. As such, wall 10 generally has an arcuate shape defined by radius R, angle θ, and length L with respect to centerline 12. Centerline 12 extends axially through the geometric center of region 11 to establish an axial direction parallel to centerline 12, a radial direction perpendicular to centerline 12, and an angular direction extending circumferentially about centerline 12. Wall 10 has high temperature gas 13 flowing axially along a radially inner surface of wall 10 in the direction shown in FIG. 2A.

Wall 10 includes at least outer wall 14, inner wall 16a, and connecting wall 18a. Depending on radius R, angle θ, and length L of wall 10, additional inner walls 16b-16i and connecting walls 18b-18i are included. Each inner wall 16a-i is connected to outer wall 14 by one of connecting walls 18a-18i. Thus, wall 10 can include a single wall 16a and connecting wall 18a or multiple inner walls and connecting walls arranged in one or more axially-extending rows 19a-c and/or circumferentially-extending columns 20a-c. Inner wall segments 16a-i are spaced axially and circumferentially from each other to define circumferential openings 21a and 21b and axial channels 22a and 22b therebetween for providing film cooling to wall 10.

Inner wall segments 16a-i can have substantially equal sizes, such as in the embodiment shown in FIG. 1A, or segments 16a-i can have different sizes such that circumferential openings 21a and 21b and axial channels 22a and 22b are distributed along wall 10. For example, circumferential openings 21a and 2b and axial channels 22a and 22b can be distributed such that the cooling per unit area of some of inner walls 16a-i is greater than the remaining inner walls 16a-i or the inner walls of an adjacent wall segment.

In prior art walls, outer wall 14, inner walls 16a-i, and connecting walls 18a-i are separate components. However, through additive manufacturing techniques, outer wall 14, inner walls 16a-i, and connecting walls 18a-i can form a monolithic body. Manufacturing wall 10 in this way allows wall 10 to have features and material combinations, described in detail below, which cannot be achieved with casting, machining, and other manufacturing techniques.

Figure 2A:
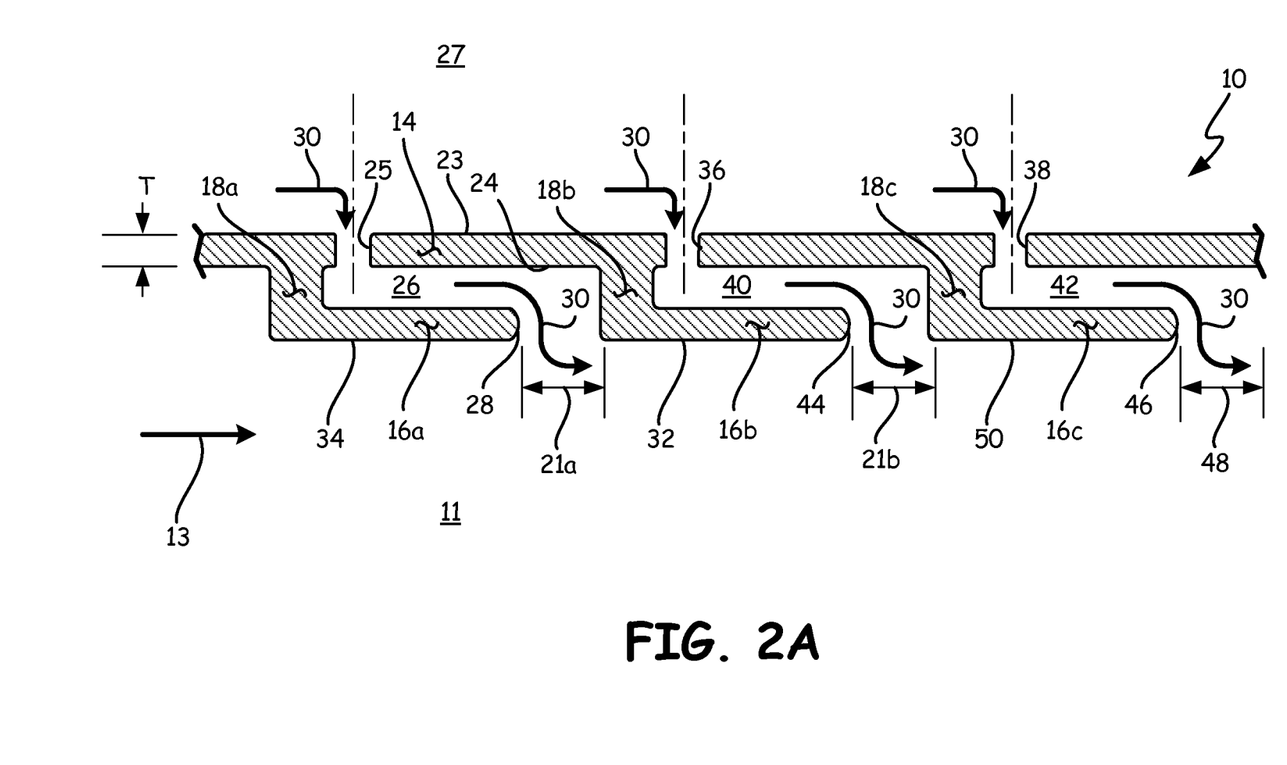
FIG. 2A is a cross-sectional view of the combustor wall taken along line 2A-2A in FIG. 1B.

FIG. 2A is a cross-sectional view of wall 10 taken along line 2A-2A in FIG. 1B that shows a single row of inner walls 16a, 16b, and 16c joined to outer wall 14 by connecting walls 18a, 18b, and 18c, respectively. The arrangement of inner walls 16a, 16b, and 16c is analogous to any other axial arrangement of inner walls 16d-f and 16g-i of wall 10.

Outer wall 14 is concave about centerline 12 that has outer surface 23 and inner surface 24, in which surface 24 is radially inward from surface 23. The distance between surfaces 23 and 24 defines thickness T of outer wall 14. Outer wall 14 couples axially and circumferentially to adjacent walls or components (not shown in FIG. 2A) to transmit various mechanical loads through outer wall 14. Mechanical loads can include circumferential loads due to pressure, axial loads dues to pressure, and assembly loads caused by interference fits between outer wall 14 and the adjacent walls and/or components (not shown in FIG. 2A). Outer wall 14 defines radial passage 25 that extends through outer wall 14 from outer surface 23 to inner surface 24. Radial passage 25 can have any cross-section. In some embodiments, radial passage 25 has a circular cross-section. However, radial passage 25 can have other cross-sectional shapes. For example, radial passage 25 can have a polygonal cross-section or form a slot extending circumferentially along outer wall 14. The size and shape of radial passage 25 is determined by the mass flow rate of cooling air required to cool inner wall 16a and/or an adjacent inner wall 16b, and in other cases, an adjacent component.

Connecting wall 18a is a continuous section that extends from outer wall 14 to inner wall 16a and circumferentially along inner wall 16a. Connecting wall 18a can be positioned at any location along the axial length of inner wall 16a. In some embodiments, connecting wall 18a is at an upstream end of inner wall 16a with respect to a flow direction of high temperature gas 13 so that inner wall 16a extends from connecting wall 18a towards an adjacent inner wall, for example inner wall 16b located downstream from inner wall 16a.

Inner wall 16a extends axially and circumferentially to form an arcuate segment that is spaced radially inward from and generally conforms to the curvature of outer wall 14 to define channel 26. Moreover, inner wall 16a extends axially from connecting wall 18a to end face 28. End face 28, which can be rounded as shown in FIG. 2A, is spaced from adjacent inner wall 16b so as to define circumferential opening 21a. Channel 26 is in flow communication with radial passage 25 and opening 21a so as to deliver cooling air 30 from region 27 to region 11 containing high temperature gas 13. Region 27 is a cavity radially outward from wall 10 that is supplied with cooling air 30 from a source on the gas turbine engine, for example compressor bleed air, or in some commercial engine applications, an external air source. Cooling air 30 has a low temperature relative to high temperature gas 13. After discharging from opening 21a, cooling air 30 interacts with high temperature gas 13 to film cool radially inner surface 32 of adjacent inner wall 16b. Depending on the relationship of wall 10 to adjacent components or walls, radially inner surface 34 of inner wall 16a can be similarly film-cooled.

Inner walls 16b and 16c are substantially similar to inner wall 16a. Accordingly, connecting walls 18b and 18c extend from outer wall 14 to join inner walls 16b and 16c, respectively. Inner walls 16b and 16c extend from connecting walls 18b and 18c, respectively, towards an adjacent, downstream inner wall. For example, inner wall 16b extends axially towards inner wall 16c whereas inner wall 16c extends towards an inner wall of an adjacent wall (not shown in FIG. 2A) or adjacent component. Outer wall 14 additionally defines radial passages 36 and 38 that extend from outer surface 23 to inner surface 24. Inner walls 16b and 16c extend axially and circumferentially to form an arcuate segment that is radially spaced from outer wall 14 to define channels 40 and 42, respectively. Moreover, inner wall 16b has end face 44 and inner wall 16c has end face 46 that are axially spaced from adjacent components to define circumferential openings 21b and 48, respectively. Thus, channel 40 is in flow communication with radial passage 36 and opening 21b. Similarly, channel 42 is in flow communication with radial passage 38 and opening 48. Each flow path delivers cooling air 30 from region 27 to region 11 containing high temperature gas 13. After exiting openings 21b and 48, cooling air interacts with high temperature gas 13 to film cool radially inner surface 50 of inner wall 16c and an inner surface of an adjacent component (shown with phantom lines in FIG. 2A), respectively.

Thus, each wall 10 includes one or more inner walls segments 16a-i that are axially and circumferentially spaced from each other to form a pattern of openings 21a and 21b and channels 22a and 22b. Each inner wall segment 16a-i is configured to deliver cooling air 30 from region 27 to region 11 to film cool a radially inner surface of an adjacent inner wall (for example radially inner surface 32) or adjacent component.

Additive manufacturing techniques allow outer wall 14, inner walls 16a-i, and connecting walls 18a-i to form a monolithic body. Although, outer wall 14, inner walls 16a-i and connecting walls 18a-i can be composed from a single material, some embodiments can have a functionally-graded distribution of material compositions tailored to the functions of each component of wall 10. For example, outer wall 14 can be composed of a metallic material that is suitable for transmitting mechanical loads through outer wall 14. Although many metallic materials are known in the art, nickel and nickel alloys are preferred for outer wall 14 because such alloys can be used for structural elements having operating temperatures between 538° C. (1000° F.) and 1093° C. (2000° F.). Moreover, inner walls 16a-i can be composed of a ceramic material that can withstand exposure to high temperature gas 13. Many ceramic materials are known in the art; however, silicon nitride is preferred for having relatively low thermal conductively and high thermal shock and wear resistance between 816° C. (1500° F.) and 1204° C. (2200° F.). Connecting walls 18a-i can have a mixture of the metallic and ceramic materials to reduce the stresses caused by differential thermal growth between inner walls 16a-i and outer wall 14. For example, inner walls 16a-i have a bulk temperature that is greater than outer wall 14, which depending on the respective coefficients of thermal expansion, can result in larger thermal growth in inner walls 16a-i than outer wall 14. As such, the mixture of metallic and ceramic materials used for connecting walls 18a-i can alleviate the differential thermal growth by distributing it along connecting walls 18a-i from inner walls 16a-i to outer wall 14 instead of absorbing the differential thermal growth at or near a discrete interface between the metallic and ceramic materials. Among the possible functionally-graded distributions are linear, stepped, and parabolic distributions of material properties that transition between the ceramic material of inner walls 16a-i to the metallic material of outer wall 14. Thus, wall 10 constructed with additive manufacture techniques provides a structurally efficient, monolithic body that eliminates mechanical connections of prior art walls.

Suitable additive manufacturing techniques include selective laser sintering (SLS), selective laser melting (SLM), and direct metal laser sintering (DMLS). Step 1 of the additive manufacturing process includes creating a three-dimensional model of wall 10. The three-dimensional model of wall 10 has all of the features described in reference to FIGS. 1A, 1B, and 2A including outer wall 14, inner walls 16a-i, connecting walls 18a-i, radial passages 25, 36, and 38, channels 26, 40, and 42, openings 21a-b, and channels 22a-b. Step 2 involves depositing a layer of material on a substrate or a previously-deposited layer in which the layer has a uniform thickness. Step 3 includes using a laser or electron beam to melt or sinter the material to form a cross-section of wall 10 according to the three-dimensional computer model. Step 4 includes repeating steps 2 and 3 to form additional cross-sections until wall 10 is fully-formed. Step 5 includes heat treating wall 10 to prepare the materials for operation.

Additionally, although FIG. 2A describes one embodiment of wall 10, other embodiments of wall 10 are described below with reference to FIGS. 2B, 2C, 2D, 2E, and 2F. With each embodiment, the above-described additive manufacturing process can be used.

Figure 2B:
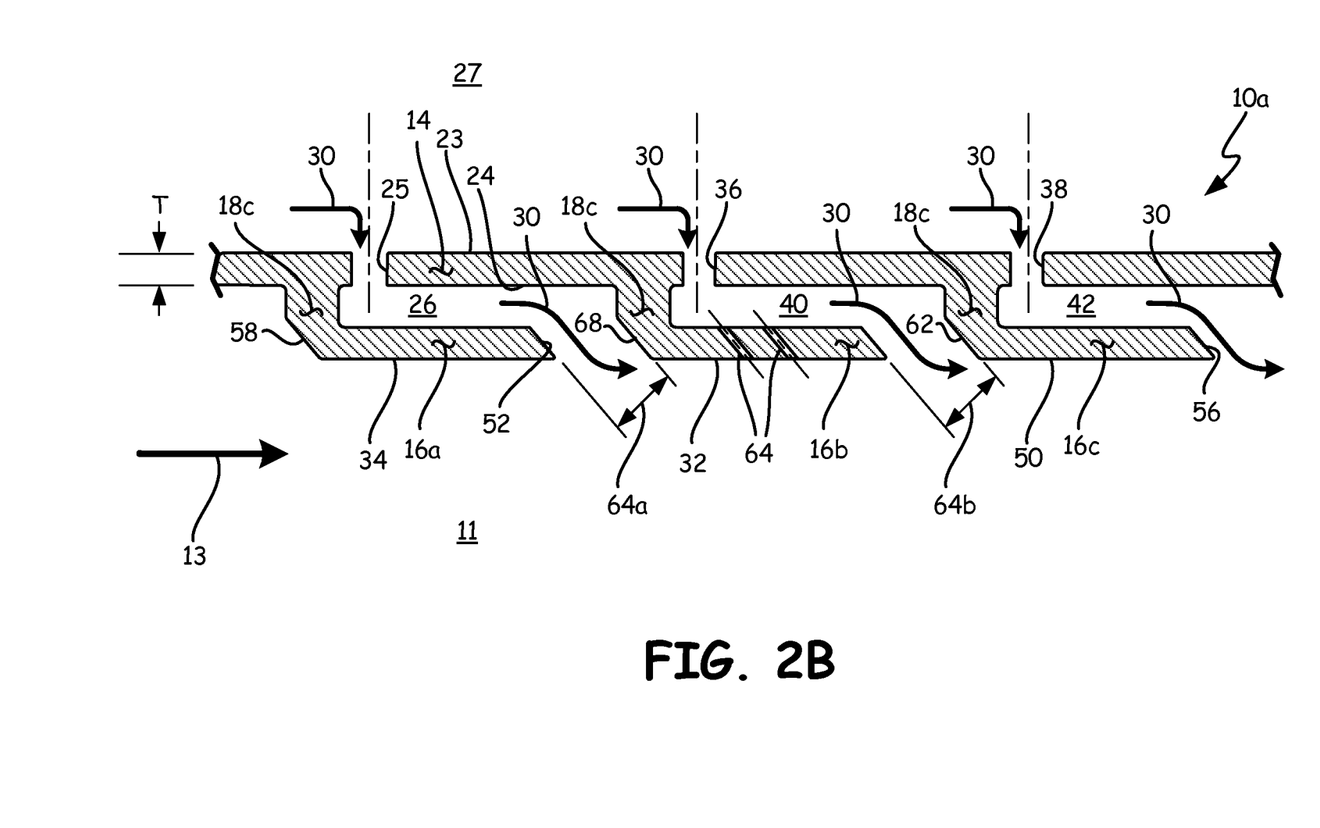
FIG. 2B is a cross-sectional view that is analogous to FIG. 2A showing an alternative configuration of the combustor wall.

FIG. 2B is a cross-sectional view of wall 10a taken along a line analogous to line 2A-2A in FIG. 1B. Wall 10a is substantially similar to wall 10 described with reference to FIG. 2A in that similarly labeled reference numbers in FIG. 2B refer to like elements in FIG. 2A. However, end walls 28, 44, and 46 are replaced with end walls 52, 54, and 56, which form an oblique angle with inner surfaces 32, 34, and 50 as shown in FIG. 2B. At an upstream end of inner walls 16a, 16b, and 16c with respect to the flow of hot gas 13, inner walls 16a, 16b, and 16b have end faces 58, 60, and 62 that also form an acute angle with the respective inner walls 16a, 16b, and 16c. End face 60 of inner wall 16b is opposite end face 52 of inner wall 16a to form opening 64a. End face 62 of inner wall 16c is opposite end face 54 to form opening 64b. Similarly, end faces 58 of inner wall 16a and end face 56 of inner wall 16c can oppose an end face of an adjacent wall or component to form additional openings. In each case, openings 64a and 64b are configured to direct cooling air 30 at an oblique angle with respect to hot gas flow 13 and inner faces 32, 34, and 50 to improve film cooling of inner walls 16a, 16b, and 16c.

Additionally, inner walls 16a, 16b, and/or 16c can include one or more apertures 64, which extend through one or more of inner walls 16a, 16b, and 16c. For example, FIG. 2B shows inner wall 16b defining apertures 64 extending therethrough to place channel 40 in flow communication with region 11 upstream of 64b. As a result, cooling air 30 discharges through apertures 64 to provide film cooling to inner surface 32 in addition to providing film cooling to inner surface 50 of adjacent inner wall 16c. Apertures 64 can be axially spaced, as shown in FIG. 2B, and/or be circumferentially spaced as required to distribute cooling air along surface 32. Although FIG. 2B shows apertures 64 formed by inner wall 16b, apertures can be placed on any of the inner walls 16a-i where additional cooling is warranted.

Figure 2C:
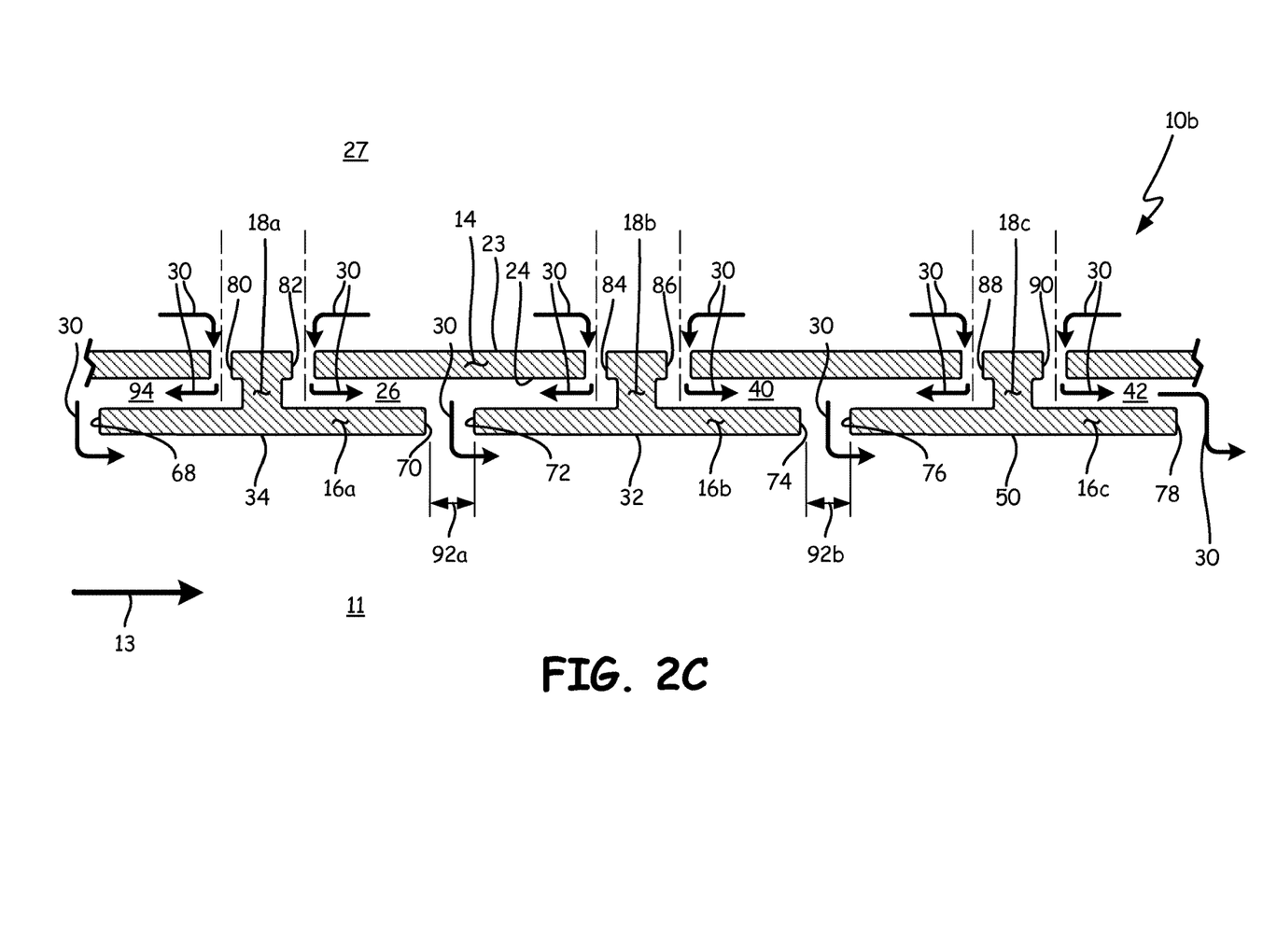
FIG. 2C is a cross-sectional view that is analogous to FIG. 2A showing an alternative configuration of the combustor wall.

FIG. 2C is a cross-sectional view of wall 10b taken along a line analogous to line 2A-2A in FIG. 1B. Wall 10b is substantially similar to wall 10 described with reference to FIG. 2A in that similarly labeled reference numbers in FIG. 2C refer to like elements in FIG. 2A. However, in this embodiment, connecting wall 18a is connected to inner wall 16a at a location between upstream end 68 and downstream end 70 of inner wall 16a. In an identical manner, connecting walls 18b and 18c join to inner walls 16b and 16c at locations between ends walls 72 and 74 and end walls 76 and 78, respectively. Outer wall 14 defines radial passages 80, 82, 84, 86, 88, and 90 that are analogous to radial passages 25, 36, and 38 discussed with reference to FIG. 2A. Therefore, cavity 26 is placed in flow communication with radial passages 82 and 84 and cavity 40 is placed in flow communication with radial passages 86 and 88. Radial passages 82 and 84 permit cooling air 30 to flow into cavity 26 and exit through opening 92a defined between end face 70 of inner wall 16a and end face 72 of inner wall 16b. Likewise, radial passages 86 and 88 permit cooling air 30 to flow into cavity 40 and exit through opening 92b defined between end face 74 of inner wall 16b and end face 76 of inner wall 16c. Additional radial passages 80 and 90 can cooperate with radial passages from adjacent walls or components to provide cooling to cavities 94 and 42.

Figure 2D:
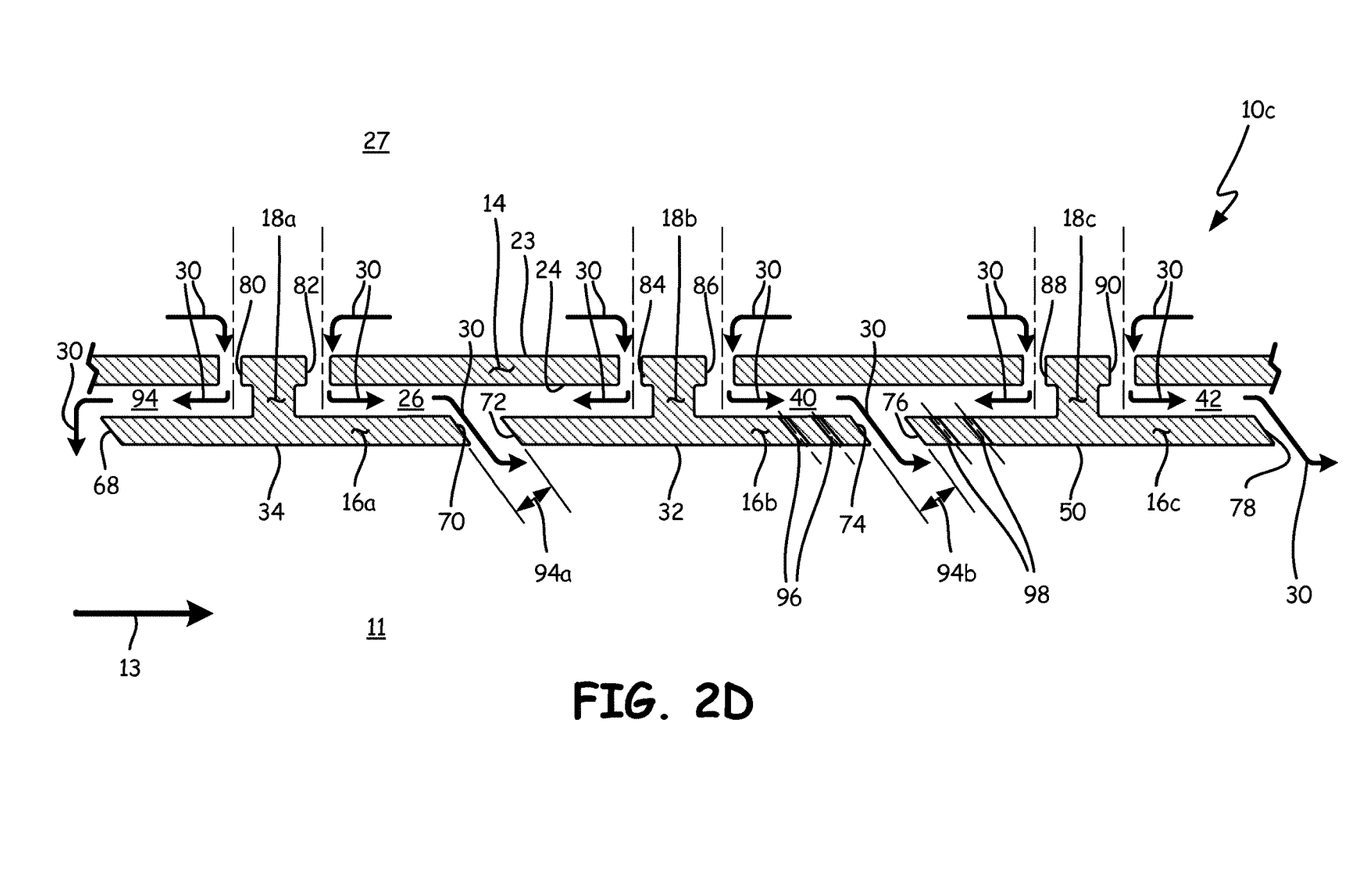
FIG. 2D is a cross-sectional view that is analogous to FIG. 2A showing an alternative configuration of the combustor wall.

FIG. 2D is a cross-sectional view of wall 10c taken along a line analogous to line 2A-2A in FIG. 1B. Wall 10c is substantially similar to wall 10b described with reference to FIG. 2C in that similarly labeled reference numbers in FIG. 2B refer to like elements in FIG. 2C. However, in the embodiment shown in FIG. 2D, end walls 68, 70, 72, 74, 76, and 78 are angled with respect to inner surfaces 32, 34, and 50. As such, opening 94a defined between end walls 70 and 72 and opening 94b defined between end walls 74 and 76 direct cooling air 30 at an oblique angle to high temperature gas 13 and inner surfaces 32, 34, and 50. Angling cooling air 30 in this manner improves film cooling performance by directing cooling air 30 in a radially inward and downstream direction with respect to high temperature gas 13.

Additionally, inner walls 16a, 16b, and 16c can include one or more apertures 96 and 98, which extend through one or more of inner walls 16a, 16b, and 16c. For example, FIG. 2D shows inner wall 16b defining apertures 96 and inner wall 16c defining apertures 98 that extending therethrough to place channel 40 in additional flow communication with region 11. As a result, cooling air 30 exits through apertures 96 and 98 to provide film cooling to inner surfaces 32 and 50 in addition to providing film cooling to inner surface 50 through opening 94b. Apertures 96 and 98 can be axially spaced, as shown in FIG. 2D, and/or be circumferentially spaced as required to distribute cooling air along surfaces 32 and 50. Although FIG. 2D shows apertures 96 and 98 formed by inner walls 16b and 16c, respectively, apertures can be placed through any of the inner walls 16a-i where additional cooling is warranted.

Figure 2E:
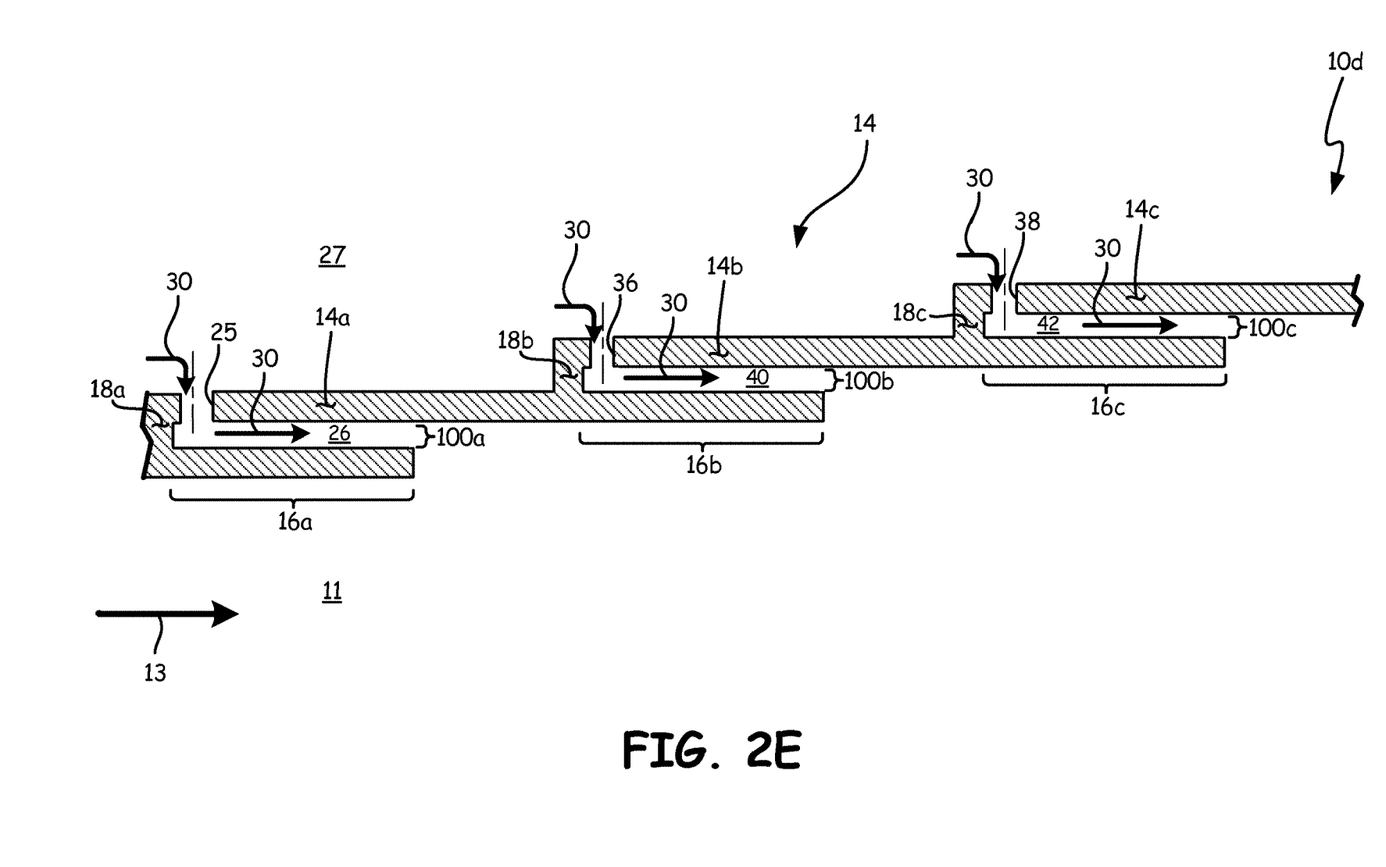
FIG. 2E is a cross-sectional view that is analogous to FIG. 2A showing an alternative configuration of the combustor wall.

FIG. 2E is a cross-sectional view of wall 10d taken along a line analogous to line 2A-2A in FIG. 1B. Wall 10d is substantially similar to wall 10a described with reference to FIG. 2A in that similarly labeled reference numbers in FIG. 2A refer to like elements in FIG. 2E. However, in the embodiment shown in FIG. 2E, annular outer wall 14 comprises a series of segments 14a, 14b, and 14c such that segment 14a is radially inward from segment 14b, which in turn, is radially inward from segment 14c. That is to say, outer wall 14 forms a stepped cone shape as depicted in FIG. 2E. Thus, inner wall 16a is joined to segment 14a by connecting wall 18a, inner wall 16b is joined to segment 14b by connecting wall 18b, and inner wall 16c is joined to segment 14c by connecting wall 18c. In this way, cooling air 30 enters channels 26, 40, and 42 through radial passages 25, 36, and 38 and enters region 11 through openings 100a, 100b, and 100c, respectively. Openings 100a, 100b, and 100c, are formed between inner walls 16a, 16b, and 16c and outer wall segments 14a, 14b, and 14c, respectively. Moreover, inner walls 16b and 16c form a contiguous surface with segments 14a and 14b, respectively, such that openings 100a and 100b direct cooling air 30 axially downstream along inner walls 16b and 16c. Similarly, opening 100c directs cooling air 30 axially downstream along outer wall segment 14c. Directing cooling air 30 axially downstream in this manner further improves the film cooling of wall 10d.

Figure 2F:
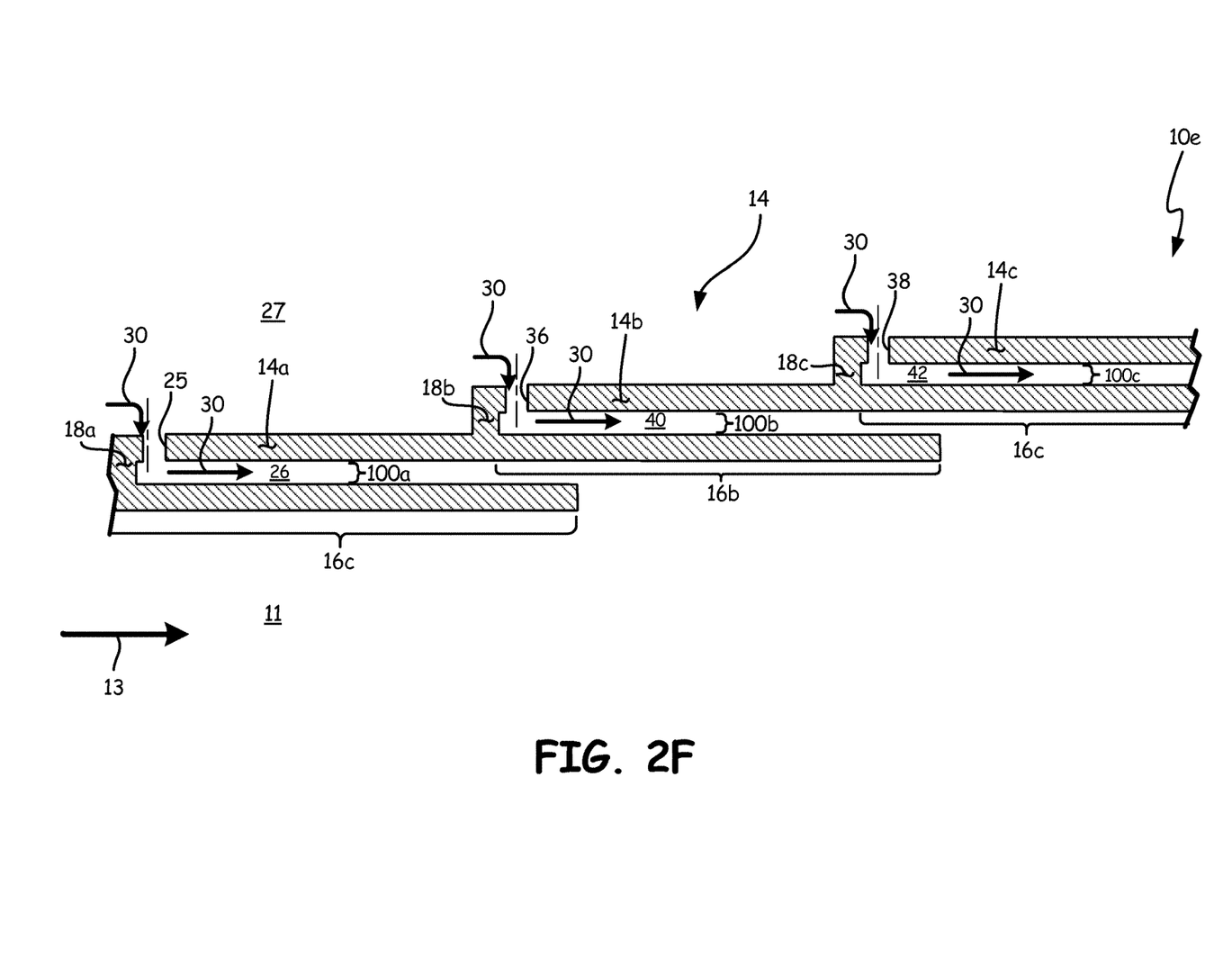
FIG. 2F is a cross-sectional view that is analogous to FIG. 2A showing an alternative configuration of the combustor wall.

FIG. 2F is a cross-sectional view of wall 10e taken along a line analogous to line 2A-2A in FIG. 1B. Wall 10e is substantially similar to wall 10d described with reference to FIG. 2E in that similarly labeled reference numbers in FIG. 2E refer to like elements in FIG. 2F. However, in the embodiment shown in FIG. 2F, inner wall 16a extends downstream from connecting wall 18b, inner wall 16b extends downstream from connecting wall 18c, and inner wall 16c extends downstream from the downstream end of outer wall segment 14c. That is to say, the axial length of inner wall 16a is greater than the axial distance between connecting walls 18a and 18b. Similarly, the axial length of inner wall 16b is greater than the distance between connecting walls 18b and 18c, and the axial length of inner wall 16c is greater than the axial length of outer wall segment 14c. Overlapping inner walls 16a, 16b, and 16c in this way increases the thermal protection of outer wall 14 making wall 10e suitable for higher temperature environments.

DISCUSSION OF POSSIBLE EMBODIMENTS

The following are non-exclusive descriptions of possible embodiments of the present invention.

A cooled wall for lining a combustor of a gas turbine engine includes an annular outer wall extending axially along a centerline and defining a radial passage extending therethrough, a first inner wall spaced radially inward from the outer all with respect to the centerline, and a first connecting wall joining the first inner wall to the outer wall. The outer wall, the first inner wall, and the first connecting wall define a channel therebewtween that is in fluid communication with the radial passage. The centerline intersects the geometric center of the gas turbine engine.

The cooled wall of the preceding paragraph can optionally include, additionally and/or alternatively, any one or more of the following features, configurations and/or additional components:

A further embodiment of the foregoing cooled wall can further include a second inner wall spaced radially inward from the annular outer wall and a second connecting wall joining the second inner wall to the annular outer wall. The second inner wall can be axially spaced from the first inner wall to define an opening between a first end of the first inner wall and a second end of the second inner wall.

A further embodiment of any of the foregoing cooled walls, wherein the annular outer wall, the first and second inner walls, and the first and second connecting walls can form a monolithic body.

A further embodiment of any of the foregoing cooled walls, wherein the cooled wall can have a radially outermost portion composed of a metallic material and a radially innermost portion composed of a ceramic material.

A further embodiment of any of the foregoing cooled walls, wherein the cooled wall can have a functionally graded distribution of the metallic and ceramic materials between the radially innermost and the radially outermost portions.

A further embodiment of any of the foregoing cooled walls, wherein the first end and the second end can be angled with respect to the centerline.

A further embodiment of any of the foregoing cooled walls, wherein one of the first and second inner walls can define a hole extending therethrough, and wherein the hole can be in fluid communication with the channel and can be configured to film-cool the cooled wall.

A further embodiment of any of the foregoing cooled walls, wherein the first connecting wall can extend a first distance from the first connecting wall towards the second inner wall and a second distance substantially equal and opposite the first distance.

A further embodiment of any of the foregoing cooled walls, wherein the first inner wall can extend from the first connecting wall towards the second inner wall.

A further embodiment of any of the foregoing cooled walls, wherein the first connecting wall joins the first inner wall to a first section of the annular outer wall, and wherein the annular outer wall includes a second section positioned radially outward and axially spaced from the first section so as to define a stepped annular shape.

A further embodiment of any of the foregoing cooled walls can further include a second inner wall spaced radially inward from the annular outer wall and a second connecting wall joining the second inner wall to the second section of the annular wall. The second inner wall can be spaced radially outward form the first inner wall to define an annular opening between a radially outer surface of the first inner wall and a radially inner surface of the second inner wall.

A further embodiment of any of the foregoing cooled walls, wherein the first connecting wall can be axially spaced form the second connecting wall a first distance, and wherein the first inner wall can extend from the first connecting wall towards the second inner wall a second distance that is greater than the first distance.

A further embodiment of any of the foregoing cooled walls, wherein the first section and the second inner wall can form a contiguous surface such that the axial channel can be aligned with the radially inner surface of the second inner wall.

A further embodiment of any of the foregoing cooled walls, wherein the first and second ends can be curved in an axial direction.

A combustor section of a gas turbine engine includes a plurality of annular wall segments defining a plurality of radial passages extending therethrough, a plurality of inner wall segments spaced radially inward from the annular wall segments so as to define axial channels therebetween in fluid communication with the radial passages, and a plurality of connecting walls extending in a generally radial direction from the plurality of annular wall segments to the plurality of inner wall segments. The plurality of annular wall segments defines a cavity for combustion having a centerline extending axially through a geometric center of the cavity. The inner wall segments are configured to define openings between adjacent inner wall segments.

The combustor section of the preceding paragraph can optionally include, additionally and/or alternatively, any one or more of the following features, configurations and/or additional components:

A further embodiment of the foregoing combustor section, wherein the openings can be configured to direct cooling air along the inner wall segments, and wherein the inner wall segments can further include a first subset of inner wall segments defining a first subset of openings and a second subset of inner wall segments defining a second subset of openings. The second subset of openings can be configured to direct more cooling air per unit area of the second subset of inner wall segments that the first subset of openings can be configured to direct on to the first subset of inner wall segments.

A method of manufacturing a cooled wall for a combustor of a gas turbine engine includes: a.) providing a three-dimensional computer model of the cooled wall, b.) depositing a powdered material to form a uniform thickness layer on a substrate or a previously deposited layer, c.) using a laser or an electron beam to melt or sinter the powdered material to form a cross-section of the cooled wall defined by the three-dimensional computer model, d.) repeating steps b-c to form a cooled wall, and e.) heat treating the cooled wall. The cooled wall includes an annular outer wall extending axially along a centerline and defining a radial passage extending therethrough, a first inner wall spaced radially inward from the outer all with respect to the centerline, and a first connecting wall joining the first inner wall to the outer wall. The outer wall, the first inner wall, and the first connecting wall define a channel therebewtween that is in fluid communication with the radial passage. The centerline intersects the geometric center of the gas turbine engine.

The method of the preceding paragraph can optionally include, additionally and/or alternatively, any one or more of the following features, configurations and/or additional components:

A further embodiment of the foregoing method, wherein the cooled wall can further include a second inner wall spaced radially inward from the annular outer wall and a second connecting wall joining the second inner wall to the annular outer wall. The second inner wall can be axially spaced from the first inner wall to define an opening between a first end of the first inner wall and a second end of the second inner wall.

A further embodiment of any of the methods, wherein the powdered material comprises a metallic material deposited at a radially outermost portion of the cooled wall and a ceramic material deposited at a radially innermost portion of the cooled wall.

A further embodiment of any of the methods, wherein the powdered material is deposited to form a functionally-graded distribution of the metallic and ceramic materials between the radially innermost and the radially outermost portions.

A further embodiment of any of the methods, wherein the functionally graded distribution of the ceramic material linearly decrease along the first connecting wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cooled wall for lining a combustor of a gas turbine comprising:
    an annular outer wall extending axially along a centerline intersecting the geometric center of the gas turbine, wherein the annular outer wall defines a radial passage, and wherein the radial passage extends through the annular outer wall;
    a first inner wall spaced radially inward from the annular outer wall with respect to the centerline;
    a first connecting wall joining the first inner wall to the annular outer wall, wherein the annular outer wall, the first inner wall, and the first connecting wall define an axial channel therebetween that is in fluid communication with the radial passage;
    a second inner wall spaced radially inward from the annular outer wall; and
    a second connecting wall joining the second inner wall to the annular outer wall, wherein the second inner wall is axially spaced from the first inner wall to define a circumferentially-extending opening between a first end face of the first inner wall and a second end face of the second inner wall;

wherein:
    the annular outer wall, the first and second inner walls, and the first and second connecting walls form a monolithic body;
    the annular outer wall is formed from a metallic material;
    the first and second inner walls are formed from a ceramic material; and
    the first and second connecting walls have a functionally graded distribution of the metallic and ceramic materials between the annular outer wall and the first and second inner walls, respectively.

2. The cooled wall of claim 1, wherein the first end face and the second end face are angled with respect to the centerline.

3. The cooled wall of claim 1, wherein one inner wall of the first and second inner walls defines a hole, and wherein the hole extends through the one inner wall to place the axial channel in fluid communication with a surface of the one inner wall, and wherein the hole is configured to film-cool the one inner wall.

4. The cooled wall of claim 1, wherein the first inner wall extends a first distance from the first connecting wall towards the second inner wall and a second distance substantially equal and opposite the first distance.

5. The cooled wall of claim 1, wherein the first inner wall extends from the first connecting wall towards the second inner wall.

6. The cooled wall of claim 1, wherein the annular outer wall comprises:
    a first segment, wherein the first connecting wall joins the first inner wall to the first segment; and
    a second segment positioned radially outward and axially spaced from the first segment so as to define a stepped annular shape; and
    wherein
        the second connecting wall joins the second inner wall to the second segment of the annular outer wall; and
        the second inner wall is spaced radially outward from the first inner wall to define an annular opening between a radially outer surface of the first inner wall and a radially inner surface of the second inner wall.

7. The cooled wall of claim 6, wherein the first connecting wall is axially spaced from the second connecting wall a first distance, and wherein the first inner wall extends from the first connecting wall towards the second inner wall a second distance that is greater than the first distance.

8. The cooled wall of claim 6, wherein the first segment and the second inner wall form a contiguous surface such that the axial channel is aligned with the radially inner surface of the second inner wall.

9. The cooled wall of claim 1, wherein the first and second ends are curved in an axial direction.

10. A combustor section of a gas turbine engine comprising:
    a plurality of annular wall segments defining a cavity for combustion having a centerline extending axially through a geometric center of the cavity and defining a plurality of radial passages, wherein each of the plurality of radial passages extends through one of the plurality of annular wall segments;
    a plurality of inner wall segments spaced radially inward from the annular wall segments so as to define axial channels between each of the inner wall segments and one of the plurality of annular wall segments, wherein the axial channel is in fluid communication with at least one of the radial passages, and wherein the inner wall segments are configured to define circumferentially-extending openings between opposing end faces of adjacent inner wall segments;

a plurality of connecting walls, each connecting wall extending from one of the plurality of annular wall segments to one of the plurality of inner wall segments;

wherein:

the annular outer wall segments are formed from a metallic material;

the inner wall segments are formed from a ceramic material; and the connecting walls have a functionally graded distribution of the metallic and ceramic materials between respective annular outer wall and inner wall segments.

11. The combustor section of claim 10, wherein the openings are configured to direct cooling air along the inner wall segments, and wherein the inner wall segments further comprise:

a first subset of inner wall segments defining a first subset of openings; and a second subset of inner wall segments defining a second subset of openings, wherein the second subset of openings is configured to direct more cooling air per unit area of the second subset of inner wall segments than the first subset of openings is configured to direct on to the first subset of inner wall segments.

12. A method of manufacturing a cooled wall for a combustor of a gas turbine engine; the method comprising:

a.) providing a three-dimensional computer model of the cooled wall;

b.) depositing a powdered material to form a uniform thickness layer on a substrate or a previously deposited layer;

c.) using a laser or an electron beam to melt or sinter the powdered material to form a cross-section of the cooled wall defined by the three-dimensional computer model; and d.) repeating steps b-c to form a cooled wall, wherein the cooled wall comprises:

an annular outer wall extending axially along a centerline intersecting the geometric center of the gas turbine, wherein the annular outer wall defines a radial passage, and wherein the radial passage extends through the annular outer wall;

a first inner wall spaced radially inward from the annular outer wall with respect to the centerline;

a first connecting wall joining the first inner wall to the annular outer wall, wherein the annular outer wall, the first inner wall, and the first connecting wall define an axial channel therebetween that is in fluid communication with the radial passage;

a second inner wall spaced radially inward from the annular outer wall; and a second connecting wall joining the second inner wall to the annular outer wall, wherein the second inner wall is axially spaced from the first inner wall to define a circumferentially-extending opening between a first end face of the first inner wall and a second end face of the second inner wall:

wherein:

the annular outer wall, the first and second inner walls, and the first and second connecting walls form a monolithic body;

the annular outer wall is formed from a metallic material;

the first and second inner walls are formed from a ceramic material; and the first and second connecting walls have a functionally graded distribution of the metallic and ceramic materials between the annular outer wall and the first and second inner walls, respectively.

13. The method of claim 12, wherein the functionally graded distribution of the ceramic material linearly decreases along the first connecting wall towards the annular outer wall.

* * * * *